(12) United States Patent
Chung et al.

(10) Patent No.: US 11,573,547 B2
(45) Date of Patent: Feb. 7, 2023

(54) METHOD FOR CONFIGURING INPUT AND OUTPUT INTERFACES, I/O INTERFACE CONFIGURATION DEVICE AND CONTROL SYSTEM

(71) Applicant: Wiwynn Corporation, New Taipei (TW)

(72) Inventors: Che-Wei Chung, New Taipei (TW); Yao-Hao Yang, New Taipei (TW); Yung Jung Du, New Taipei (TW)

(73) Assignee: WIWYNN CORPORATION, New Taipei (TW)

(*) Notice: Subject to any disclaimer, the term of this patent is extended or adjusted under 35 U.S.C. 154(b) by 397 days.

(21) Appl. No.: 16/131,085

(22) Filed: Sep. 14, 2018

(65) Prior Publication Data

US 2019/0346818 A1   Nov. 14, 2019

(30) Foreign Application Priority Data

May 11, 2018   (TW) .................................. 107116011

(51) Int. Cl.
*G05B 19/042* (2006.01)
*G05B 19/045* (2006.01)

(52) U.S. Cl.
CPC ....... *G05B 19/0423* (2013.01); *G05B 19/045* (2013.01); *G05B 2219/21012* (2013.01); *G05B 2219/33125* (2013.01)

(58) Field of Classification Search
CPC .............. G05B 19/045; G05B 19/0423; G05B 2219/21012; G05B 2219/33125; G06F 30/34; G06F 2219/25125
USPC ........................................................... 710/10
See application file for complete search history.

(56) References Cited

U.S. PATENT DOCUMENTS

| | | | | |
|---|---|---|---|---|
| 6,717,541 B1* | 4/2004 | Carter-Lewis | ......... | G01D 21/02 341/155 |
| 7,076,572 B1* | 7/2006 | Siraj | ....................... | H04L 29/06 370/465 |
| 7,730,242 B2* | 6/2010 | Tsuchiya | ............... | G06F 13/385 370/241 |
| 8,346,991 B2* | 1/2013 | Lusetti | .................. | G06F 13/385 710/10 |
| 8,368,424 B1* | 2/2013 | Han | ................. | H03K 19/17772 326/38 |

(Continued)

*Primary Examiner* — Idriss N Alrobaye
*Assistant Examiner* — Brooke J Taylor
(74) *Attorney, Agent, or Firm* — Locke Lord LLP; Tim Tingkang Xia, Esq.

(57) ABSTRACT

An I/O interface configuration device for configuring I/O interfaces comprises an input interface, an output interface, a storage unit, a detecting pin, a converting unit and a computing unit. The input interface electrically connects to a controlling port of a controlling circuit to receive a data type. The output interface electrically connects to a controlled port of a controlled device to output another data type. The storage unit stores a plurality of configuration files, one of the configuration files corresponds to a circuit type of the controlling circuit. The detecting pin is adapted to retrieve the circuit type. The converting unit converts the data type to said another data type and selectively outputs said another data type from the output interface. The computing unit loads the configuration file corresponding to the circuit type and control the converting unit to configure the I/O interface according to the configuration file.

10 Claims, 2 Drawing Sheets

(56) References Cited

U.S. PATENT DOCUMENTS

| | | | | |
|---|---|---|---|---|
| 2009/0049419 | A1* | 2/2009 | Kato | G06F 30/34 716/128 |
| 2010/0054260 | A1* | 3/2010 | Pandey | H04L 49/351 370/395.53 |
| 2015/0067226 | A1* | 3/2015 | Iskandar | G06F 13/4031 710/309 |
| 2015/0277935 | A1* | 10/2015 | Desimone | G06F 13/382 710/313 |
| 2015/0304465 | A1* | 10/2015 | Sweet, III | H04B 1/3888 455/575.1 |
| 2016/0092386 | A1* | 3/2016 | Sakamoto | G06F 13/426 710/106 |
| 2016/0132358 | A1* | 5/2016 | Antony | G06F 13/107 726/4 |
| 2017/0005703 | A1* | 1/2017 | Junk | G01D 9/00 |
| 2017/0293580 | A1* | 10/2017 | Hsieh | G06F 13/385 |
| 2018/0032064 | A1* | 2/2018 | Fang | G05B 19/0425 |
| 2019/0026240 | A1* | 1/2019 | Sachidanandam | G06F 13/36 |

\* cited by examiner

METHOD FOR CONFIGURING INPUT AND OUTPUT INTERFACES, I/O INTERFACE CONFIGURATION DEVICE AND CONTROL SYSTEM

CROSS-REFERENCE TO RELATED APPLICATIONS

This non-provisional application claims priority under 35 U.S.C. § 119(a) on Patent Application No(s). 107116011 filed in Taiwan on May 11, 2018, the entire contents of which are hereby incorporated by reference.

Technical Field

This disclosure relates to an electrical device, more particularly to an I/O interface configuration device, a method using the I/O interface configuration device and a control system using the device.

Related Art

In recent years, the evolution of servers moves toward high storage density and high storage capacity besides improving computing performance, reducing power consumption and enhancing heat dissipation. For the information application of the general enterprise, no matter the information system used inside the enterprise or the cloud network service provided outside the enterprise, the indispensable key is big data access. Therefore, the storage product adopted by the enterprise usually needs to configure a large number of storage devices such as HDD (Hard Disk Drive) or SSD (Solid State Disk) to satisfy market demands. In order to control a great number of storage devices, the solution of system design of enterprise-level storage products adopts an expander chip or a RAID (Redundant Array of Independent Disks) controller to provide high data availability, stable performance, high reliability and extra capacity.

SUMMARY

According to one or more embodiments of this disclosure, a method for configuring input and output interfaces adapted to electrically connect a controlling circuit to a controlled device, wherein the controlling circuit has a circuit type and comprises a controlling port, and the controlled device comprises a controlled port, said method for configuring input and output interfaces comprises: electrically connecting the controlling port to an input interface of an FPGA; electrically connecting the controlled port to an output interface of the FPGA; storing a plurality of configuration files by a storage unit, wherein one of the plurality of configuration files corresponds to the circuit type of the controlling circuit; retrieving the circuit type of the controlling circuit by a detecting pin of the FPGA after the controlling circuit electrically connects to the FPGA; loading the configuration file corresponding to the circuit type from the storage unit by a computing unit of the FPGA; and controlling a converting unit of the FPGA for configuring the input interface and the output interface by the computing unit according to the configuration file corresponding to the circuit type.

According to one or more embodiments of this disclosure, an I/O interface configuration device for configuring input and output interfaces adapted to electrically connect a controlling circuit to a controlled device, wherein the controlling circuit has a circuit type and comprises a controlling port, and the controlled device comprises a controlled port, the I/O interface configuration device comprises: an input interface adapted to electrically connect to the controlling port for receiving a data type sent by the controlling port; an output interface adapted to electrically connect to the controlled port for outputting another data type; a storage unit storing a plurality of configuration files, wherein one of the plurality of configuration files corresponds to the circuit type of the controlling circuit; a detecting pin retrieving the circuit type of the controlling circuit; a converting unit electrically connecting to the input interface and the output interface, wherein the converting unit corresponds to the controlled device, converts the data type to said another data type and is adapted to selectively output said another data type through the output interface; and a computing unit electrically connecting to the detecting pin, the storage unit and the converting unit, wherein the computing unit is adapted to load the configuration file corresponding to the circuit type from the storage unit and control the converting unit to configure the input interface and the output interface according to the configuration file of the circuit type.

According to one or more embodiments of this disclosure, a control system comprises: a controlling circuit having a circuit type and comprising a controlling port; a controlled device comprising a controlled port, wherein the controlled device is adapted to receive an instruction or a data from the controlled port; and an I/O interface configuration device for configuring input and output interfaces electrically connecting to the controlling circuit and the controlled device, and the I/O interface configuration device comprising: an input interface adapted to electrically connect to the controlling port for receiving a data type sent by the controlling port; an output interface adapted to electrically connect to the controlled port for outputting another data type, wherein said another data type is the instruction or the data; a storage unit storing a plurality of configuration files, wherein one of the plurality of the configuration files corresponds to the circuit type of the controlling circuit; a detecting pin retrieving the circuit type of the controlling circuit; a converting unit electrically connecting to the input interface and the output interface, wherein the converting unit corresponds to the controlled device, converts the data type to said another data type and is adapted to selectively output said another data type through the output interface; and a computing unit electrically connecting to the detecting pin, the storage unit and the converting unit, wherein the computing unit is adapted to load the configuration file corresponding to the circuit type from the storage unit and control the converting unit to configure the input interface and the output interface according to the configuration file of the circuit type.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
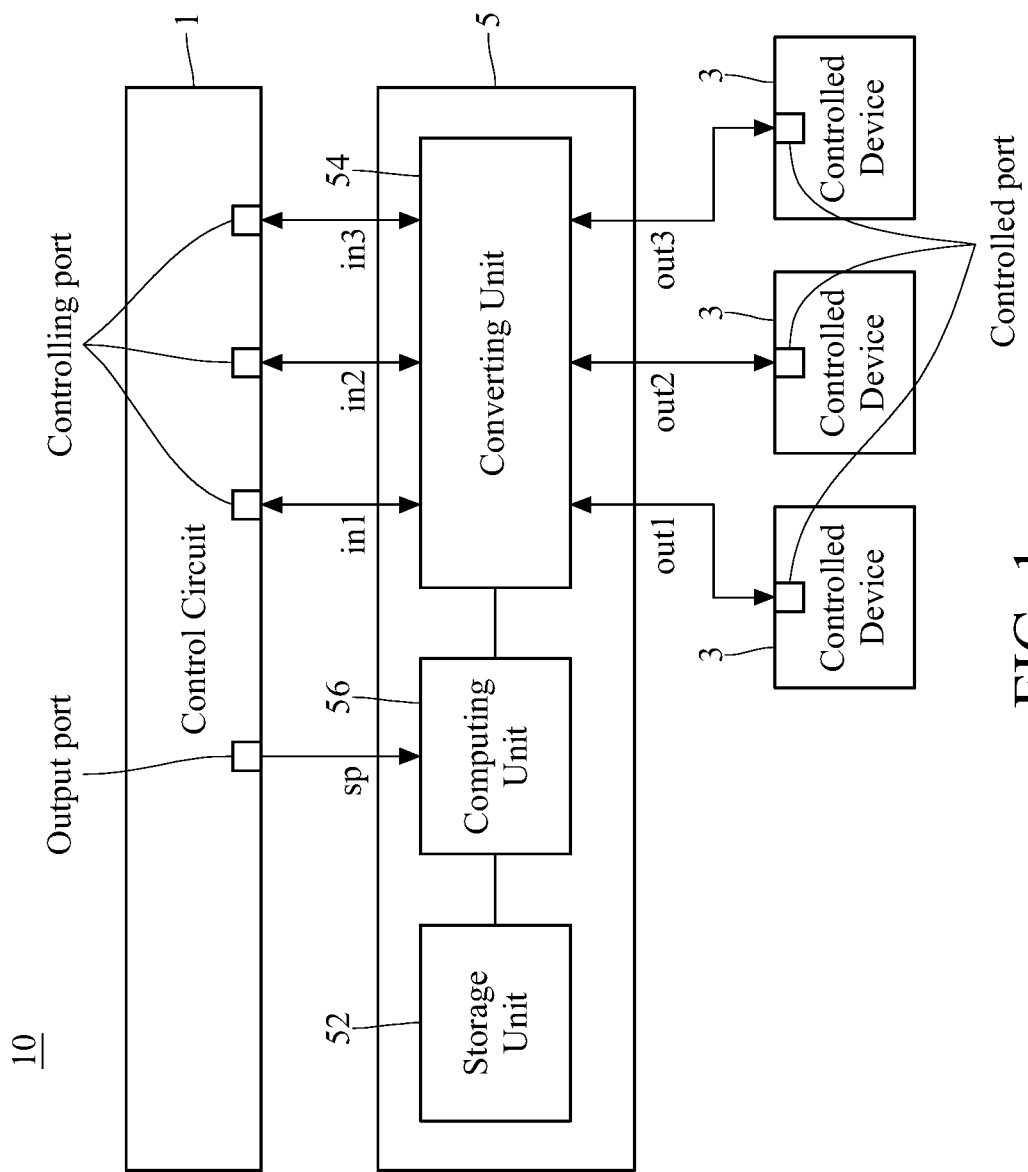
FIG. 1 is an architecture diagram of a control system according to an embodiment of the present disclosure.

Please refer to FIG. 1, which illustrates an architecture diagram of a control system 10 according to an embodiment of the present disclosure. The control system 10 comprises a controlling circuit 1, a controlled device 3 and an I/O interface configuration device 5 for configuring input and output interfaces.

The controlling circuit 1 has a circuit type and comprises a controlling port. In practice, the controlling circuit 1 is, for example, an expander chip applied to an enterprise-level storage product, a RAID (Redundant Array of Independent Disks) controller chip, or an ASIC (Application-Specific Integrated Circuit) that has similar functions to the above devices. The controlling port is such as a PPI (Parallel Peripheral Interface), an SPI (Serial Peripheral Interface), a GPIO (General Purpose Input Output), or an I²C (Inter-Integrated Circuit), but not limited to the above types or combinations thereof. The controlling circuits 1 produced by different manufacturers have different circuit types and their controlling ports are also different. It should be noticed that the control system 10 of an embodiment according to the present disclosure can adaptively adjust the I/O interface configuration device 5 based on different control circuits 1 to achieve the target that the controlling circuit 1 controls the controlled device 3.

The controlled device 3 has a controlled port. The controlled device 3 receives an instruction or a data from the controlled port, then executes the received instruction or stores the received data. The controlled port of the controlled device 3 is such as an SPI, an I²C, an SGPIO (Serial General Purpose Input Output) or a combination of above types but not limited to the above types only. In addition, in practice, there may be a plurality of controlled devices 3 with different interface types. For example, an LED (Light-Emitting Diode) using the SGPIO, a button, a 7-segment display, a fan control module, a current/voltage/temperature sensing module using the I²C, or an EEPROM (Electrically-Erasable Programmable Read-Only Memory). The present disclosure does not limit the number of the controlled devices 3.

The I/O interface configuration device 5 electrically connects to the controlling circuit 1 and the controlled device 3 as shown in FIG. 1. The I/O interface configuration device 5 comprises the input interfaces in1·in3, the output interfaces out1·out3, the storage unit 52, the detecting pin sp, the converting unit 54, and the computing unit 56. Practically, the I/O interface configuration device 5 is an FPGA (Field Programmable Gate Array, FPGA) or a CPLD (Complex Programmable Logic Device).

The input interfaces in1-in3 electrically connect to the controlling ports respectively for receiving data types sent by the controlling ports. Practically, the input interfaces in1-in3 are PPI, SPI, GPIO or I²C. The output interfaces out1-out3 electrically connect to controlled ports respectively for outputting another data type, wherein said another data type is the instruction or the data. Output interfaces out1-out3 are SPI, GPIO or I²C. In practice, the input interfaces in1-in3 and the output interfaces out1-out3 can be composed of general-purpose hardware pins on the FPGA, and the interface type of these generic hardware pins can be specified by modifying the program burning on the FPGA. In other words, a set of general-purpose hardware pins can represent specific types of input interfaces in1-in3 or output interfaces out1-out3 according to specific programs running on the FPGA.

The storage unit 52 stores a plurality of configuration files, and one of these configuration files corresponds to the circuit type of the controlling circuit 1. In practice, the specification of the controlling ports of the various controlling circuits 1 can be obtained in advance, thus the required input and output interfaces can be configured by programming, and the configuration files corresponding to these controlling circuits 1 can be stored in the storage unit 52. The storage unit 52 is, for example, a block RAM of the FPGA, or an external storage device such as EPROM (Erasable Programmable Read Only Memory), OTPROM (One Time Programmable Read Only Memory), EEPROM (Electrically Erasable Programmable Read Only Memory) or Flash Memory.

The detecting pin sp in FIG. 1 electrically connects to the controlling circuit 1 for retrieving the circuit type of the controlling circuit 1. In general, each brand's controlling circuit 1 has an output port indicating its circuit type or hardware identification number. Therefore, one or more hardware pins of the FPGA can be designated as the detecting pin sp by modifying the program running on the FPGA. These hardware pins are electrically connected to the circuit type output port or the hardware identification number output port of the controlling circuit 1, so that the circuit type of the controlling circuit 1 can be retrieved by the detecting pin sp after the control system 10 is powered on.

The converting unit 54 electrically connects to the input interfaces in1-in3 and the output interfaces out1-out3 as shown in FIG. 1. The converting unit 54 corresponds to the controlled device 3, converts a data type to another data type and is adapted to selectively output said another data type through the output interfaces out1-out3. Practically, the converting unit 54 is such as a protocol converter circuit implemented by the logical elements in the FPGA in cooperation with a program written in an HDL (Hardware Description Language). Specifically, writing a program then burning on the FPGA can implement the function of the converting unit 54. Generally, different controlling circuits 1 adopt different interfaces to load programs. For example, a 4-pin SPI can be used to load a program, and a 20-pin PPI can also be used to load a program. These two hardware interfaces are different in the number of hardware pins. In order to make the control system 10 and the I/O interface configuration device 5 described in the embodiment of the present disclosure applicable to the interfaces described above, the converting unit 54 converts the data applicable for PPI type to another data type applicable for SPI, then using the multiplexer to integrate original input interfaces into a single SPI output interface for connecting to the SPI flash as the controlled device 3. In another embodiment of the present disclosure, the converting unit 54 can convert GPIO with different number of pins into SGPIO with fewer pins. In still another embodiment, the converting unit 54 transmits the data of a specified number of connecting ports from a different sets of I²C through the multiplexer. In this embodiment, the converting unit 54 may also adopt an I²C multiplexer chip directly. As described above, the converting unit 54 has the converting sub-programs running on the FPGA, and these sub-programs are corresponding to various types of controlling ports of the controlling circuit 1.

The computing unit 56 electrically connects to the detecting pin sp, the storage unit 52 and the converting unit 54 as shown in FIG. 1. The computing unit 56 loads the configuration file corresponding to the circuit type from the storage unit 52 and controls the converting unit 54 to configure the input interfaces in1-in3 and the output interfaces out1-out3 according to the configuration file. Because the storage unit 52 has stored the configuration files of various circuit types in advance, these configuration files are used to specify the connecting types of all controlling ports of the controlling circuit 1. As a result, when the computing unit 56 retrieves the circuit type of the controlling circuit 1 adopted currently through the detecting pin sp, the computing unit 56 can instantly load the configuration file and control the converting unit 54 to configure the interfaces in1-in3 and the output interfaces out1-out3. For example, one configuration of the input interfaces in1-in3 is that: a set of 20-pin PPI, a set of 50-pin GPIO, and five sets of I²C; another configuration of the input interfaces in1-in3 is that: a set of 4-pin SPI, a set of 60-pin GPIO, and eight sets of I²C. In general, the computing unit 56 switches different interface types according to the configuration file stored in the storage unit 52. In practice, the computing unit 56 is, for example, a judgment circuit implemented by logic units in an FPGA in cooperation with the program written in HDL, or a single-chip microprocessor that can be directly served as the computing unit 56. Specifically, the functions of the computing unit 56 can be implemented by writing a program and burning it on the FPGA.

Figure 2:
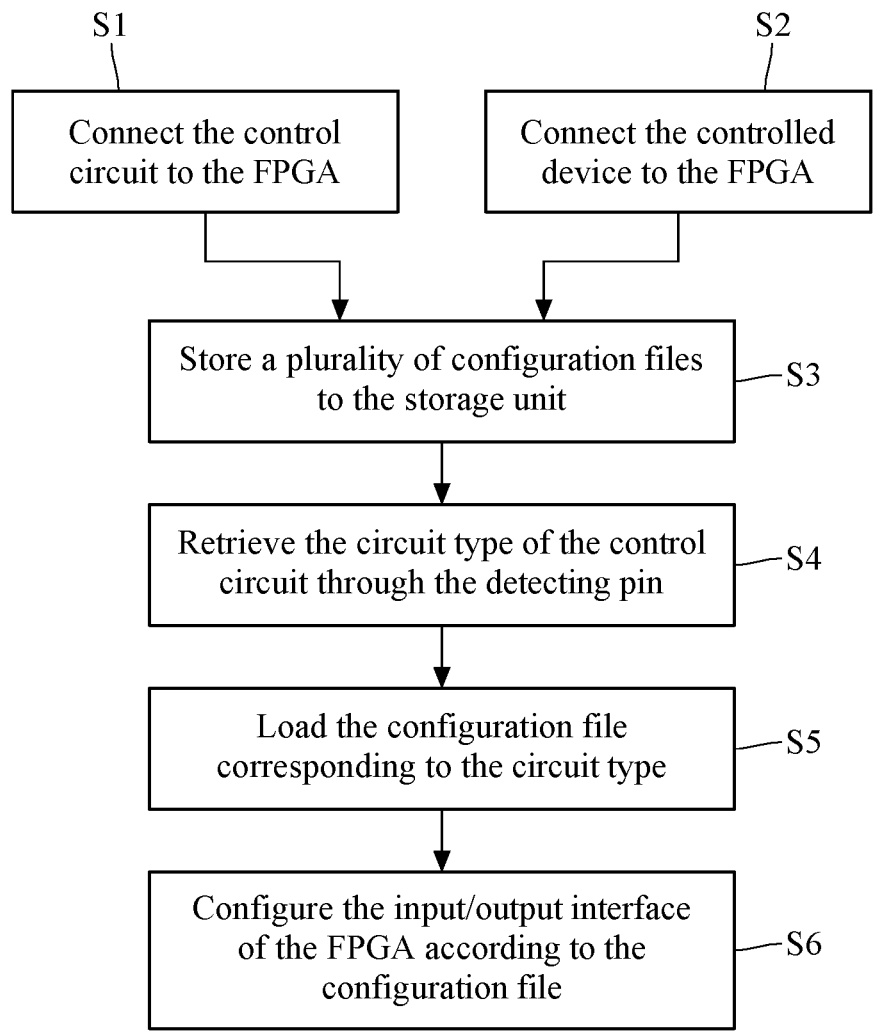
FIG. 2 is a flowchart of a method for configuring input and output interfaces according to an embodiment of the present disclosure.

Please refer to FIG. 2, which illustrated a flowchart of a method for configuring input and output interfaces according to an embodiment of the present disclosure. The method is adapted to electrically connect a controlling circuit 1 to a controlled device 3, wherein the control unit 1 has a circuit type and comprises a controlling port, and the controlled device 3 comprises a controlled port. The method for configuring input and output interfaces comprises the following steps.

Please refer to step S1, "Connect the controlling circuit 1 to the FPGA" as shown in FIG. 2. Specifically, in this step, all of the hardware circuits of the controlling port are electrically connected to the input interfaces in1-in3 of the FPGA.

Please refer to step S2, "Connect the controlled device 3 to the FPGA" as shown in FIG. 2. Specifically, in this step, all of the hardware circuits of the controlled port are electrically connected to the output interfaces out1-out3 of the FPGA.

Please refer to step S3, "Store a plurality of configuration files to the storage unit 52" as shown in FIG. 2. Specifically, the input interfaces in1-in3 and the output interfaces out1-out3 of the FPGA are configured in advance by writing the program according to the specifications of the controlling port of the various controlling circuits 1 to be supported. These configuration files are stored in the storage unit 52, and each configuration file corresponds to a circuit type of controlling circuit 1.

Please refer to step S4, "Retrieve the circuit type of the controlling circuit 1 through the detecting pin sp" as shown in FIG. 2. Specifically, because the electrical connection relations between the controlling circuit 1 and the FPGA have been established in the step S1, the circuit type of the controlling circuit 1 can be immediately retrieved through the detecting pin sp after powering on the FPGA and the controlling circuit 1.

Please refer to step S5, "Load the configuration file S5 corresponding to the circuit type" as shown in FIG. 2. Specifically, the configuration file corresponding to the circuit type of the controlling circuit 1 is loaded from the storage unit 52 by the computing unit 56 of the FPGA.

Please refer to step S6, "Configure the input and output interfaces of the FPGA according to the configuration file" as shown in FIG. 2. Specifically, the computing unit 56 controls converting unit 54 of the FPGA to configure the input interfaces in1-in3 and the output interfaces out1-out3 according to the configuration file corresponding to the circuit type.

To sum up, the method and the I/O interface configuration device for configuring input and output interfaces and the control system plan the hardware's input and output through FPGA programs for configuring the interfaces that support various kinds of control chips and the hardware specifications required by customers. According to the present disclosure, the development time of the enterprise-level storage product can be greatly reduced, and the flexibility of the product function is thus improved.

What is claimed is:

1. A method for configuring input and output interfaces adapted to electrically connect a controlling circuit to a controlled device, wherein the controlling circuit comprises a controlling port and an output port indicating a hardware identification number of the controlling circuit, and the controlled device comprises a controlled port, said method for configuring input and output interfaces comprising:

electrically connecting the controlling port to an input interface of an FPGA, wherein the input interface is configured to receive a data type sent by the controlling port;

controlling a converting unit of the FPGA to convert the data type into another data type;

electrically connecting the controlled port to an output interface of the FPGA, wherein the output interface is configured to output said another data type;

storing a plurality of configuration files by a storage unit, wherein one of the plurality of configuration files corresponds to the hardware identification number of the controlling circuit;

retrieving the hardware identification number of the controlling circuit by a detecting pin of the FPGA after the controlling circuit electrically connects to the FPGA, wherein the detecting pin is electrically connected to the output port of the controlling circuit and a computing unit of the FPGA;

loading the configuration file corresponding to the hardware identification number from the storage unit by the computing unit of the FPGA; and controlling the converting unit of the FPGA for configuring the input interface and the output interface by the computing unit according to the configuration file corresponding to the hardware identification number.

2. An I/O interface configuration device for configuring input and output interfaces adapted to electrically connect a controlling circuit to a controlled device, wherein the controlling circuit comprises a controlling port and an output port indicating a hardware identification number of the controlling circuit, and the controlled device comprises a controlled port, the I/O interface configuration device comprises:

an input interface adapted to electrically connect to the controlling port for receiving a data type sent by the controlling port;

an output interface adapted to electrically connect to the controlled port for outputting another data type;

a storage unit storing a plurality of configuration files, wherein one of the plurality of configuration files corresponds to the hardware identification number of the controlling circuit;

a detecting pin retrieving the hardware identification number of the controlling circuit, wherein the detecting pin is electrically connected to the output port of the controlling circuit;
a converting unit electrically connecting to the input interface and the output interface, wherein the converting unit corresponds to the controlled device, converts the data type to said another data type and is adapted to selectively output said another data type through the output interface; and
a computing unit electrically connecting to the detecting pin, the storage unit and the converting unit, wherein the computing unit is adapted to load the configuration file corresponding to the hardware identification number from the storage unit and control the converting unit to configure the input interface and the output interface according to the configuration file of the hardware identification number.

3. The I/O interface configuration device according to claim 2, wherein the I/O interface configuration device is an FPGA or a CPLD.

4. The I/O interface configuration device according to claim 2, wherein the controlling circuit is an expander chip or a RAID control chip.

5. The I/O interface configuration device according to claim 2, wherein the input interface is PPI, SPI, GPIO, or I$^2$C.

6. The I/O interface configuration device according to claim 2, wherein the output interface is SPI, SGPIO, or I$^2$C.

7. A control system comprises:
a controlling circuit comprising a controlling port and an output port indicating a hardware identification number of the controlling circuit;
a controlled device comprising a controlled port, wherein the controlled device is adapted to receive an instruction or a data from the controlled port; and
an I/O interface configuration device for configuring input and output interfaces electrically connecting to the controlling circuit and the controlled device, and the I/O interface configuration device comprising:
an input interface adapted to electrically connect to the controlling port for receiving a data type sent by the controlling port;
an output interface adapted to electrically connect to the controlled port for outputting another data type, wherein said another data type is the instruction or the data;
a storage unit storing a plurality of configuration files, wherein one of the plurality of the configuration files corresponds to the hardware identification number of the controlling circuit;
a detecting pin retrieving the hardware identification number of the controlling circuit, wherein the detecting pin is electrically connected to the output port of the controlling circuit;
a converting unit electrically connecting to the input interface and the output interface, wherein the converting unit corresponds to the controlled device, converts the data type to said another data type and is adapted to selectively output said another data type through the output interface; and
a computing unit electrically connecting to the detecting pin, the storage unit and the converting unit, wherein the computing unit is adapted to load the configuration file corresponding to the hardware identification number from the storage unit and control the converting unit to configure the input interface and the output interface according to the configuration file of the hardware identification number.

8. The control system according to claim 7, wherein the I/O interface configuration device is an FPGA or a CPLD.

9. The control system according to claim 7, wherein the input interface is PPI, SPI, GPIO, or I$^2$C.

10. The control system according to claim 7, wherein the output interface is SPI, SGPIO, or I$^2$C.

* * * * *